United States Patent
Evers et al.

(10) Patent No.: US 9,529,720 B2
(45) Date of Patent: Dec. 27, 2016

(54) VARIABLE DISTANCE BYPASS BETWEEN TAG ARRAY AND DATA ARRAY PIPELINES IN A CACHE

(71) Applicant: Advanced Micro Devices, Inc., Sunnyvale, CA (US)

(72) Inventors: Marius Evers, Sunnyvale, CA (US); John Kalamatianos, Arlington, MA (US); Carl D. Dietz, Columbia City, IN (US); Richard E. Klass, Fort Collins, CO (US); Ravindra N. Bhargava, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 515 days.

(21) Appl. No.: 13/912,809

(22) Filed: Jun. 7, 2013

(65) Prior Publication Data
US 2014/0365729 A1 Dec. 11, 2014

(51) Int. Cl.
*G06F 12/08* (2016.01)
(52) U.S. Cl.
CPC ....... *G06F 12/0855* (2013.01); *G06F 12/0844* (2013.01); *G06F 12/0846* (2013.01)
(58) Field of Classification Search
CPC .............. G06F 12/0855; G06F 12/0844; G06F 12/0846

USPC .......................................... 711/118, 128, 140
See application file for complete search history.

(56) References Cited

U.S. PATENT DOCUMENTS

| 6,944,724 | B2* | 9/2005 | Chaudhry | G06F 12/0855 711/118 |
|---|---|---|---|---|
| 7,529,889 | B2* | 5/2009 | Vasekin | G06F 12/0884 711/118 |
| 8,825,955 | B2* | 9/2014 | Sleiman | G06F 12/0844 711/118 |
| 2009/0006756 | A1* | 1/2009 | Donley | .......................... 711/128 |
| 2009/0006777 | A1* | 1/2009 | Donley et al. | ................. 711/154 |

* cited by examiner

*Primary Examiner* — Arpan P. Savla (57) ABSTRACT

The present application describes embodiments of techniques for picking a data array lookup request for execution in a data array pipeline a variable number of cycles behind a corresponding tag array lookup request that is concurrently executing in a tag array pipeline. Some embodiments of a method for picking the data array lookup request include picking the data array lookup request for execution in a data array pipeline of a cache concurrently with execution of a tag array lookup request in a tag array pipeline of the cache. The data array lookup request is picked for execution in response to resources of the data array pipeline becoming available after picking the tag array lookup request for execution. Some embodiments of the method may be implemented in a cache.

20 Claims, 8 Drawing Sheets

| T0 | T1 | T2 | T3 | T4 |
|----|----|----|----|----|
| A  |    |    |    |    |
| B  | A  |    |    |    |
| C  | B  | A  |    |    |
|    | C  | B  | A  |    |
|    |    | C  | B  | A  |
|    |    |    | C  | B  |
|    |    |    |    | C  |
|    |    |    |    |    |

505

| D0 | D1 | D2 | D3 | D4 |
|----|----|----|----|----|
| A  |    |    |    |    |
| ○  | A  |    |    |    |
| B  | ○  | A  |    |    |
| ○  | B  | ○  | A  |    |
| C  | ○  | B  | ○  | A  |
|    | C  | ○  | B  | ○  |
|    |    | C  | ○  | B  |
|    |    |    | C  | ○  |
|    |    |    |    | C  |

VARIABLE DISTANCE BYPASS BETWEEN TAG ARRAY AND DATA ARRAY PIPELINES IN A CACHE

FIELD OF THE DISCLOSURE

This application relates generally to processing systems, and, more particularly, to a variable distance bypass between the tag array and data array pipelines in a cache of a processing system.

BACKGROUND

A conventional instruction cache or data cache includes a tag array to store information identifying the cache lines that are stored in the cache and a data array to store the data for the cache line. When the cache receives a request to read a memory location, the cache uses the memory address to look up the cache line in the tag array. A data lookup can also be used to read the data stored in the cache line out of the data array. The tag array lookup and the data array lookup can be performed sequentially. For example, the tag array lookup may be performed and, if the request hits in the tag array, the data array lookup may subsequently be performed. The tag array lookup is typically performed in a multi-stage pipeline and so the cache will not know whether the tag array lookup hit or missed in the tag array until several cycles after the tag array pipeline has begun executing the tag array lookup. The data array lookup is therefore delayed by several cycles when it is performed sequentially with the tag array lookup. For example, a data array lookup request may be delayed by 10 cycles for a 1 MB cache and 12 cycles for a 2 MB cache when they are performed sequentially with the tag array lookup request.

The tag array lookup and the data array lookup can also be performed in parallel. For example, the tag array lookup may be picked for execution in the tag array pipeline in the same cycle (or with a fixed one cycle delay) in which the data array lookup is picked for execution in the data array pipeline. However, the data array lookup cannot be picked for execution unless the data array pipeline has resources available to process the data array lookup. If the data array pipeline resources are not available at the time the tag array lookup is picked for execution, the data array lookup request is not performed in parallel with the tag array lookup and instead must be performed sequentially with the tag array lookup request. Consequently, many data array lookup requests are delayed by several cycles when the data array pipeline resources are not available.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

The present application describes embodiments of a cache that can pick a data array lookup request for execution in a data array pipeline concurrently with execution of a corresponding tag array lookup request in a tag array pipeline. The number of cycles between picking the tag array lookup request for execution and picking the data array lookup request for execution is variable, rather than fixed, and depends on particular system conditions. Thus, the data array lookup request can be opportunistically picked for execution in response to resources becoming available in a data array pipeline after the tag array lookup request has begun processing in the tag array pipeline. For example, data array pipeline resources may not be available to execute the data array lookup request when the corresponding tag array lookup request is picked for execution, but may become available one or more cycles later. The data array lookup may therefore be marked as ready in response to the tag array lookup being picked for execution. And, once the data array pipeline resources are available, the data array lookup request can be picked and begin executing concurrently with the corresponding tag array lookup request. By allowing the delay between picking of the tag array lookup request and the picking of the corresponding data array lookup request to vary according to system conditions, the delay between initiating the tag array lookup and the data array lookup is reduced and the overall throughput of the tag array pipeline and data array pipeline are improved.

Figure 1:
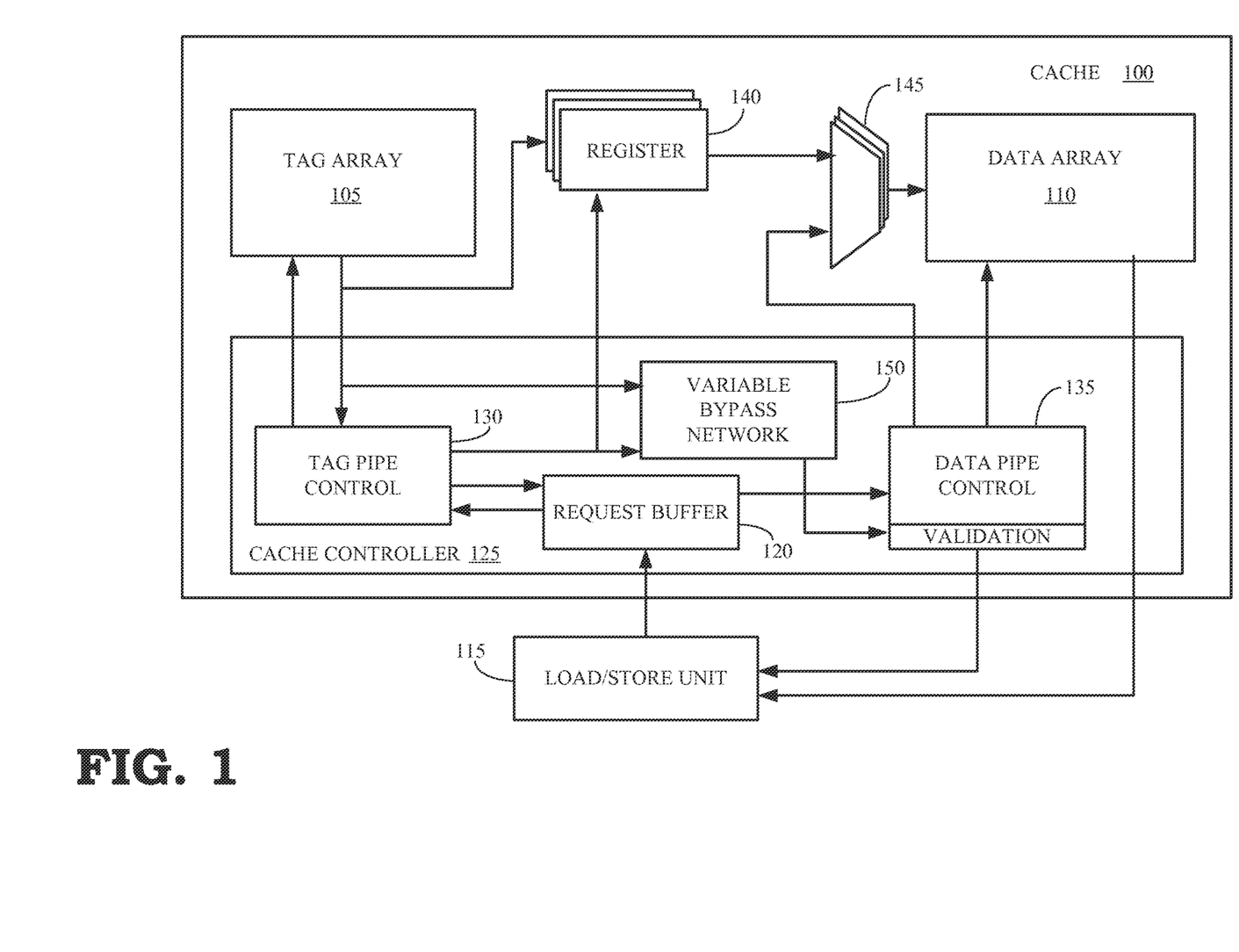
FIG. 1 is a block diagram of a cache and a load/store unit of a processing system, according to some embodiments.

FIG. 1 is a block diagram of a cache 100, according to some embodiments. The cache 100 may be implemented in a processing system such as a central processing unit (CPU), a graphics processing unit (GPU), or an accelerated processing unit (APU). For example, the cache 100 may be an L2 cache in a cache hierarchy that includes one or more L1 caches. In processing systems that implement multiple processor cores, each processor core may have an associated L1 instruction (L1-I) cache and an L1 data (L1-D) cache. When an instruction is scheduled for processing by the processor core, the processor core first attempts to fetch the instruction for execution from the L1-I cache, which returns the requested instruction if the instruction is resident in a cache line of the L1-I cache. However, if the request misses in the L1-I cache, the request is forwarded to the L2 cache. If the request hits in the L2 cache, the L2 cache returns the requested line to the L1-I cache. Data associated with the instruction may be read from or stored to cache lines in the L1-D cache. Otherwise, the L2 cache may request the line from a higher-level cache such as an L3 cache or main memory. Some embodiments of the cache 100 may be used to implement L1 caches, L3 caches, or other types of caches.

The cache 100 includes a tag array 105 for storing information (e.g., tags) that identifies the cache lines that are stored in the cache 100. For example, each tag in the tag array 105 may include a portion of a memory address of the memory location that stores a copy of the information stored in the corresponding cache line. Some embodiments of the tag array 105 may store information in "slices" that each include a subset of the tags in the tag array 105. For example, a 2 MB tag array 105 may include 16 slices of 128 kB. The tag array 105 may perform a tag array lookup to determine whether a tag included in a tag array lookup request matches one or more tags of the cache lines that are stored in the cache 100. If the tag in the tag array lookup request matches a tag in the tag array 105, the tag array lookup request "hits" in the tag array, which indicates that the requested cache line is present in the cache 100. Otherwise, the tag array lookup request "misses" in the tag array 105, which indicates that the requested cache line is not present in the cache 100. As discussed herein, the tag array 105 may implement a tag array pipeline for performing the tag array lookup and returning information indicating whether the tag array lookup hit or missed in the tag array 105.

Some embodiments of the cache 100 may be associative so that each memory location can be mapped to a particular subset of the cache lines in the cache 100. The subsets are conventionally referred to as "ways." For example, a location in memory can be cached in either of two ways of a two-way associative cache 100. Embodiments of the cache 100 may implement any associativity including direct mapping, two-way associative, four-way associative, fully associative, and the like. The tag array 105 may therefore return information identifying the way of the cache line in the cache 100 when the tag array lookup hits in the tag array 105.

To ensure proper operation of the associated processing system, data stored in the cache 100 should be consistent with data stored in other caches or memory in the processing system. The cache 100 may therefore implement a cache coherency protocol that assigns states to each cache line that indicate the state of the data in the corresponding cache line. One exemplary cache coherency protocol is the MOESI protocol which defines the Modified, Owned, Exclusive, Shared, and Invalid states for cache lines in the caches implemented in a processor system that implements multiple processor cores. Persons of ordinary skill in the art having benefit of the present disclosure should also appreciate that the cache 100 may implement other cache coherency protocols that may assign other states to each cache line. The state of the cache line may be stored in the tag array 105 and some embodiments of the tag array may return information identifying the state of the cache line when the tag array lookup hits in the tag array 105.

The cache 100 also includes a data array 110 for storing the data in each cache line. The cache 100 shown in FIG. 1 is a data cache that is used to temporarily hold data as the data is loaded from a memory location into a register or while storing data from a register into a memory location. The data array 110 may therefore receive data that is being loaded into the memory location associated with the cache line. Data may also be read out of the data array 110, e.g., in response to a data array lookup request. Some embodiments of the data array 110 implement a pipeline for executing data array lookups in response to data array lookup requests.

The cache 100 includes or is associated with a load/store unit 115 that executes load instructions or store instructions generated by an instruction pipeline (not shown) or other module of the associated processing system. Some embodiments of the load/store unit 115 may therefore issue requests to read data from a cache line in the cache 100. The read requests may be issued to a request buffer 120 in a cache controller 125. The cache 100 executes a read request using at least two operations: a tag array lookup in the tag array 105 to determine whether the request hits in the cache 100 and a data array lookup to read out the requested data from the data array 110. Thus, a tag array lookup request can be associated with a data array lookup request. The request buffer 120 includes pick logic for picking the tag array lookup requests and data array lookup requests for execution in the pipelines implemented in the tag array 105 or data array 110. For example, the request buffer 120 may pick a tag array lookup request and provide the tag array lookup request to a tag pipe control logic 130, which may initiate execution of the tag array lookup in the tag array pipeline in the tag array 105.

To initiate a data array lookup for a read request, the request buffer 120 may pick the data array lookup request that corresponds to the picked tag array lookup request for the read request and provide information identifying the picked data array lookup request to data pipe control logic 135. The data array lookup requests can be picked a variable number of cycles after the corresponding tag array lookup request has been picked. In some embodiments, the data array lookup requests are picked in response to resources becoming available in the data array 110. For example, a data array pipeline of the data array 110 may not have any resources available to execute a new data array lookup request when a new tag array lookup request is picked, but resources may subsequently become available, e.g., if a previously picked tag array lookup request misses in the tag array 105. Consequently, the resources that would have been used to perform the data array lookup for the previously picked tag array lookup are no longer needed. The unused resources of the data array pipeline may be used to perform the new data array lookup request concurrently with the new tag array lookup request.

The cache 100 includes variable bypass logic that can be used to distribute information generated by the tag array 105 during execution of a tag array lookup to the data array 110 for use during the data array lookup. Some embodiments of the variable bypass logic include one or more registers 140 that are used to store hit or way information for a tag array lookup request. For example, the tag array 105 may generate hit/way information indicating that the tag array lookup request hit (or missed) in the cache and information identifying the way of the cacheline that was hit. The information generated by a tag array lookup request may be stored in a register 140 if the tag array lookup request is associated with an instruction that reads data out of the data array 110. For example, the tag pipe control logic 130 may provide a capture control signal to the register 140 so that the register 140 captures hit/way information generated by the tag array 105.

The hit/way information can then be provided to the data array 110 via multiplexers 145 if the corresponding data array lookup request is picked for concurrent execution with the tag array lookup request. Some embodiments of the variable bypass logic include multiple registers 140 and multiplexers 145 to support multiple slices in the tag array 105. Each combination of a register 140 and a multiplexer 145 can then receive the hit/way information for one of the slices. The hit/way information for a tag array lookup can remain in the register 140 until it is overwritten by another tag array lookup associated with another instruction that reads data out of the data array 110. Once the hit/way information for a tag array lookup has been overwritten, the corresponding data array lookup request is no longer eligible to be picked for execution a variable number of cycles after the tag array lookup request and may instead be performed sequentially with the tag array lookup. Some embodiments of the variable bypass logic may alternatively be implemented using a register pipeline and a corresponding multiplexer, as discussed herein with regard to FIG. 3.

Some embodiments of the tag array 105 may also provide hit/way/state information to a variable bypass network 150 that stores this information in case it is needed for a data array lookup that is performed concurrently with a tag array lookup. For example, the variable bypass network 150 may receive the hit/way/state information for a plurality of tag array lookups that are being executed in the tag array pipeline and may store this information in a register pipeline. The hit/way/state information for one of the tag array lookups may then be provided to the data pipe control logic 135 in response to the request buffer 120 picking a corresponding one of the data array lookups for execution. Some embodiments of the data pipe control logic 135 may use the hit/way/state information to validate the results of the data array lookup based on the state of the corresponding cache line. For example, the results of the data array lookup may be validated if the state information indicates that the information read from the data array 110 is valid and may be invalidated if the state information indicates that this information is invalid.

Figure 2:
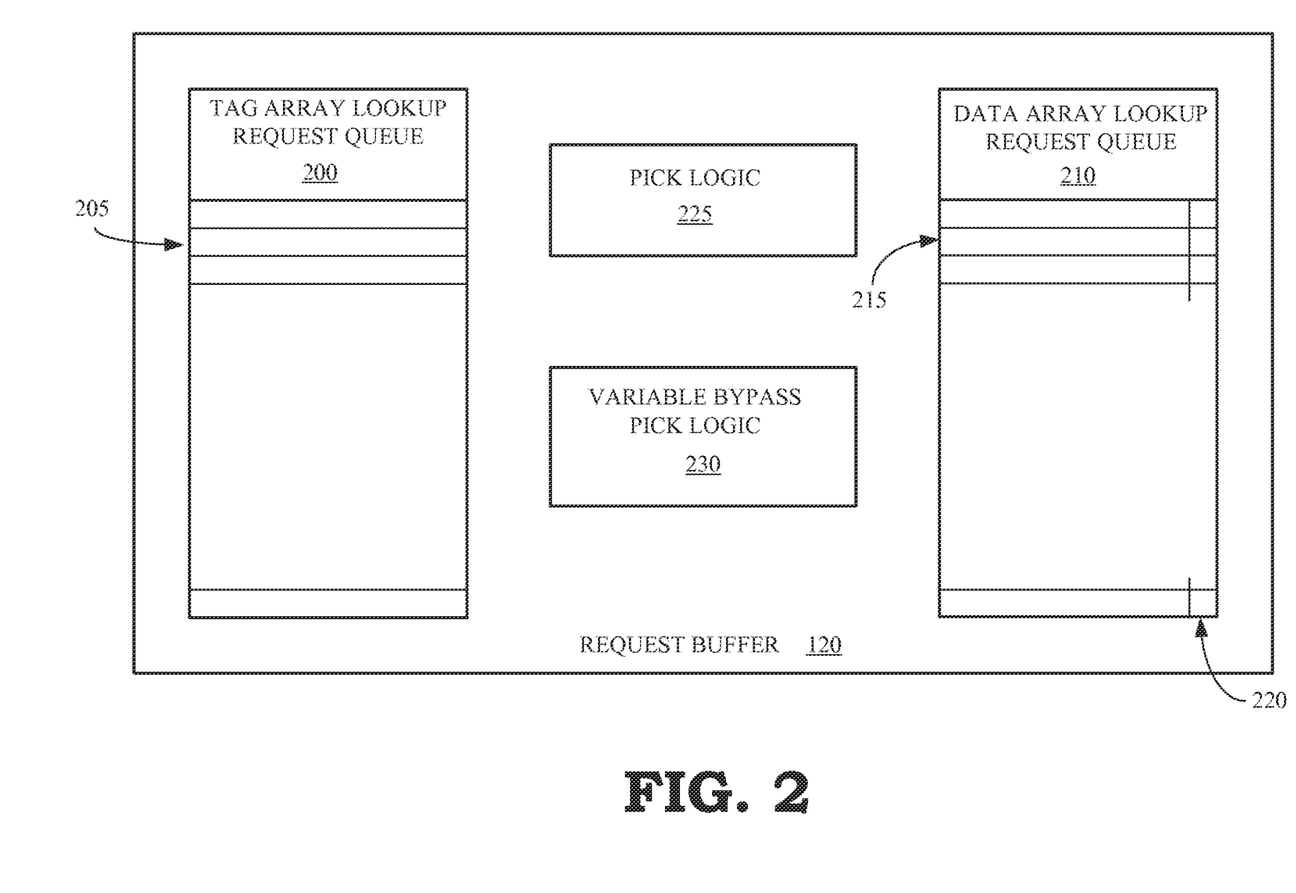
FIG. 2 is a block diagram of a request buffer such as the request buffer shown in FIG. 1, according to some embodiments.

FIG. 2 is a block diagram of a request buffer such as the request buffer 120 shown in FIG. 1, according to some embodiments. The request buffer 120 includes a tag array lookup request queue 200 that stores entries 205 (only one indicated by a reference numeral in the interest of clarity) corresponding to each tag array lookup request that has been provided to the request buffer 120, e.g., by the load/store unit 115 shown in FIG. 1. The entries 205 may be stored in the tag array lookup request queue 200 in age order. For example, the age of entries 205 may increase from the bottom to the top of the queue 200 so that entries 205 at the top of the queue 200 may be older than entries 205 at the bottom of the queue. The relative age of the entries 205 may be indicated by the actual position of the entries 205 in the storage elements that make up the queue 200 or by pointers from one entry 205 to the next oldest or youngest entry 205.

The request buffer 120 also includes a data array lookup request queue 210 that stores entries 215 corresponding to each data array lookup request that has been provided to the request buffer 120, e.g., by the load/store unit 115 shown in FIG. 1. Since the tag array lookup requests can be associated with a data array lookup request, e.g., a read request may include a tag array lookup request to determine whether the information is in the cache and a data array lookup request to read the data from the cache, entries 205 can be associated with entries 215. As discussed herein with regard to the tag array lookup request queue 200, the entries 215 may be stored in the data array lookup request queue 210 in age order. Each entry 215 in the data array lookup request queue 210 includes a ready bit 220 that can be set (e.g., assigned a value of 1) to indicate that the data array lookup request associated with the entry 215 is ready to be picked for execution in the data array pipeline. Some embodiments of the request buffer 120 may set the ready bit 220 for an entry 215 in response to a corresponding tag array lookup request completing execution in the tag array pipeline and receiving a "hit" indication. In some embodiments, the tag and data array lookup request queues 200, 210 may be combined into a single queue with some shared information and some information, such as the ready bits 220, that are dedicated to either the tag or data portion of the request queue.

Pick logic 225 is used to pick entries 205 in the tag array lookup request queue 200 for execution by the tag array pipeline. For example, the pick logic 225 may pick the entry 205 that holds the oldest ready tag array lookup request in the tag array lookup request queue 200. As discussed herein, the oldest tag array lookup request can be identified based on the age order of the entries 205 in the tag array lookup request queue 200. The picked tag array lookup request may then be signaled to tag pipe control logic 130 and executed in the tag array pipeline of the tag array 105. Once the picked tag array lookup request completes execution in the tag array pipeline, the ready bit 220 associated with the corresponding data array lookup request may be set.

The pick logic 225 may also pick entries 205 in the data array lookup request queue 210 for execution by the data array pipeline. Some embodiments of the pick logic 225 pick the entry 215 that holds the oldest ready data array lookup request in the data array lookup request queue 210. For example, the tag and data array lookup requests may be performed sequentially so the pick logic 225 may pick the entry 215 that holds the data array lookup request corresponding to a tag array lookup that has completed execution in the tag array pipeline, e.g. as indicated by a set value of the corresponding ready bit 220. Data array lookup requests picked by the pick logic 225 after completion of the corresponding tag array lookup may be referred to as "explicit" picks because the data array lookup requests are explicitly chosen by the picker 225 after it is known that the tag array lookup request has completed. However, as discussed herein, not all of the data array lookup requests consume the data array pipeline resources that may be allocated to the data array lookup request. For example, a tag array lookup and a data array lookup may be initiated in parallel but the tag array lookup may miss in the cache 100. In that case, the data array lookup can be aborted or not picked at all, thereby freeing up data array pipeline resources.

Variable bypass pick logic 230 is used to pick entries 215 corresponding to data array lookup requests in response to resources in the data array pipeline becoming available. These picks may be referred to as "implicit" picks because the data array pick is an implicit side effect of the tag array pick. For example, if a tag array lookup request misses in the tag array 105, the pick logic 225 may not pick the entry 215 for the corresponding data array lookup request or, if the entry for the corresponding data array lookup request has already been picked for execution, execution of the data array lookup in the data array pipeline may be aborted or flushed from the data array pipeline. These resources may therefore become available for other data array lookup requests. The variable bypass pick logic 230 may then pick the oldest entry 215 that corresponds to a tag array lookup request that is currently being executed in the tag array pipeline for execution in the data array pipeline using the newly available resources. The number of cycles between picking the tag array lookup request and the data array lookup request may therefore vary depending on the availability of resources in the data array pipeline and may not be known when the tag array lookup request is picked.

Some embodiments of the variable bypass pick logic 230 may prioritize the entries 215 based upon the position of the corresponding tag array lookup request in the tag array pipeline. For example, a priority of an entry 215 corresponding to a tag array lookup request may be set based on the number of cycles since the corresponding tag array lookup request was picked for execution in the tag array pipeline. The variable bypass pick logic 230 may also control the flow of information from the tag array 105 to the data array 110. For example, information identifying the entry 215 picked by the variable bypass pick logic 230 may be provided to variable bypass logic (such as the register(s) 140, multiplexer(s) 145, or variable bypass network 150 shown in FIG. 1) so that information generated by the corresponding tag array lookup can be provided to the data array 110 or data pipe control logic 135.

Figure 3:
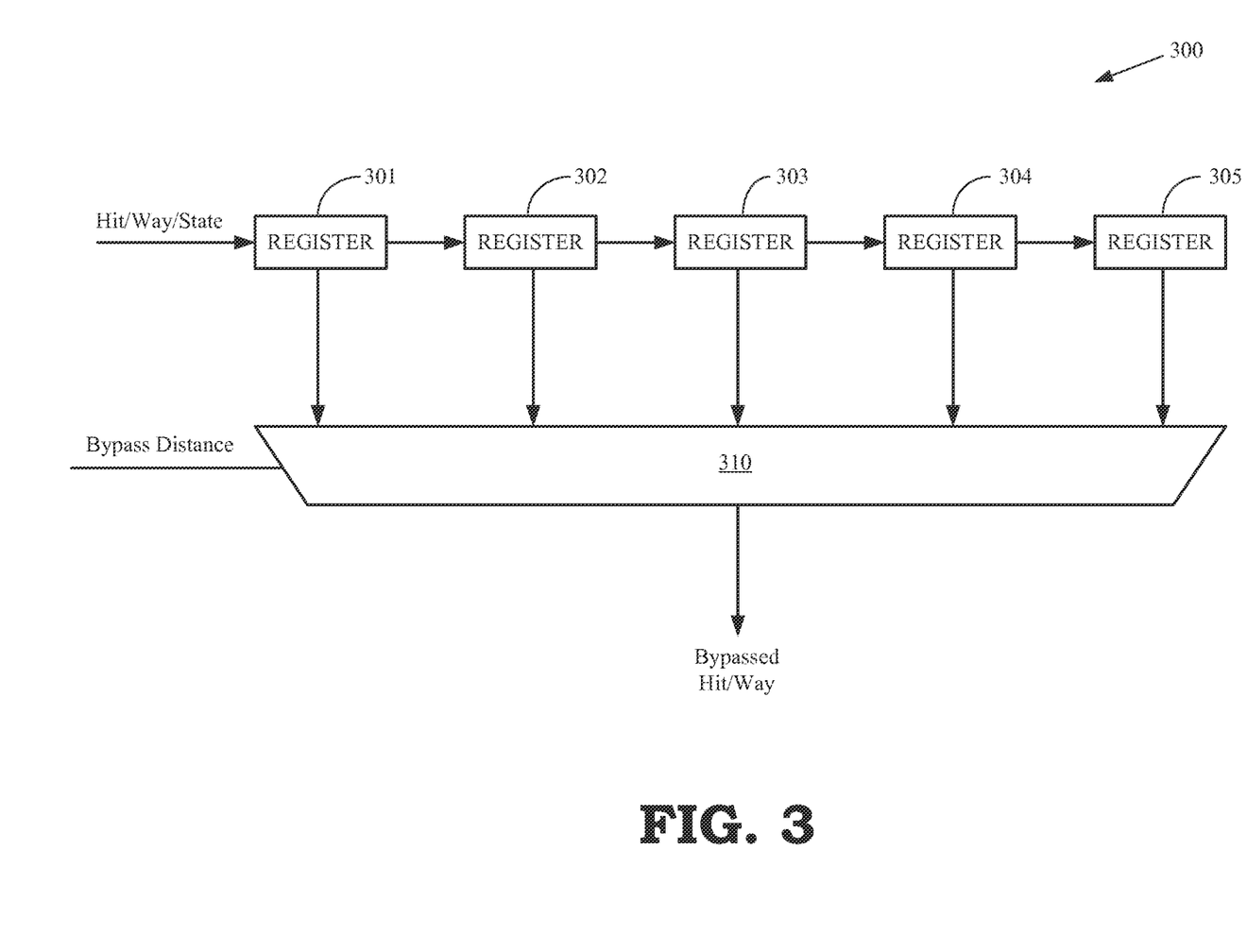
FIG. 3 is a block diagram of a variable bypass network that may be implemented in the cache shown in FIG. 1, according to some embodiments.

FIG. 3 is a block diagram of a variable bypass network 300 that may be implemented in the cache 100 shown in FIG. 1, according to some embodiments. The variable bypass network 300 includes a register pipeline made up of a plurality of registers 301-305. The number of registers depends on the depth of the pipeline. Information may be input into the register 301 during a first clock cycle and then shifted rightward to the register 302 in the next clock cycle, and so on until the information is shifted through each of the registers 301-305. Embodiments of the variable bypass network 300 used to implement the variable bypass network 150 shown in FIG. 1 may receive hit/way/state information from the tag array 105 and store this information in the register pipeline. Embodiments of the variable bypass network 300 may also be used in place of the registers 140 and multiplexers 145, in which case the hit/way information provided by the tag array 105 may be stored in the register pipeline.

A multiplexer 310 is used to select information stored in one of the registers 301-305 and provide this information to other entities in the cache 100 such as the data array 110 or the data pipe control logic 135. This information may be referred to as the "bypass" information because it is provided directly to the entities in the cache 100 and bypasses other logic used to convey this information between the pipeline stages of the tag array pipeline and a data array pipeline. The multiplexer 310 may receive a select signal that indicates the number of cycles between picking the tag array lookup request for execution and picking the corresponding data array lookup request for execution. The number of cycles is referred to as the "bypass distance." For example, if the data array lookup request follows the tag array lookup request by three cycles, the bypass distance is 3 and the select signal provided to the multiplexer 310 selects the information stored in the register 303 because this register stores the information provided by the tag array lookup request that was picked three cycles prior to the data array lookup request. In some embodiments, the select signal may be generated by the variable bypass pick logic 230 shown in FIG. 2.

Figure 4:
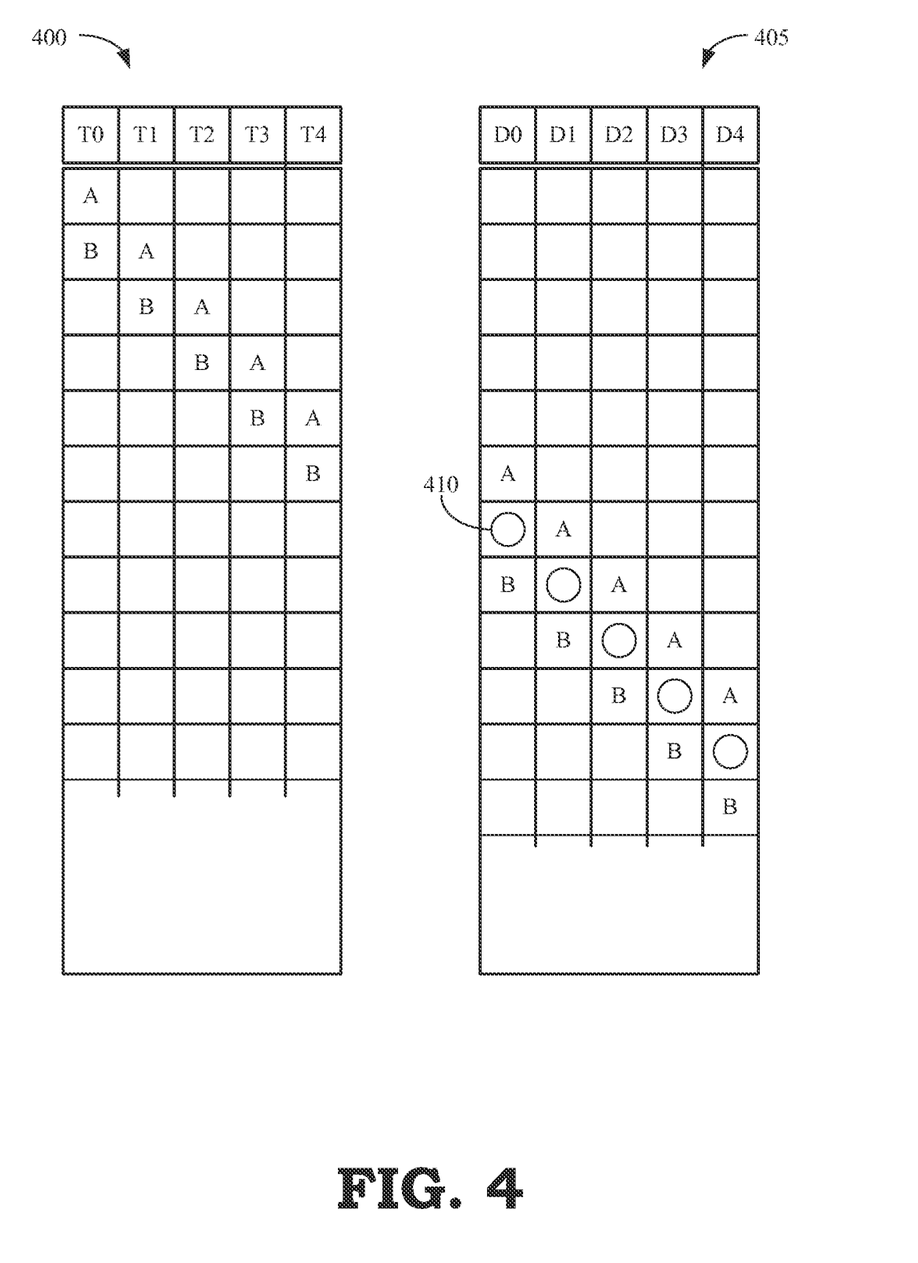
FIG. 4 is a diagram of a tag array pipeline for use in the tag array shown in FIG. 1 and a data array pipeline for use in the data array shown in FIG. 1, according to some embodiments.

FIG. 4 is a diagram of a tag array pipeline 400 for use in the tag array 105 shown in FIG. 1 and a data array pipeline 405 for use in the data array 110 shown in FIG. 1, according to some embodiments. Time increases from top to bottom in the tag array pipeline 400 and the data array pipeline 405 and each box indicates one cycle of operation for the pipelines 400, 405. The particular sequence of instructions shown in FIG. 4 is exemplary and is only intended to illustrate some principles of the operation of the pipelines 400, 405.

The tag array pipeline 400 includes five stages (T0, T1, T2, T3, and T4) along the horizontal axis of the tag array pipeline 400. For example, the T0 stage may be a wire stage used to convey a tag array lookup request to the pipeline logic, the T1 stage may be a decoding stage to decode the tag array lookup request, the T2 stage may be an array access stage, and the T3 stage may be a comparison stage. Together, the stages T0-T3 may be used to determine whether the tag array lookup request hits in the tag array 105 and to identify the way of the cache line. The stage T4 may be a wire cycle that is used to move the hit/way information, as well as any state information associated with the cache line, to the tag array pipeline control logic or other entities in the system. However, persons of ordinary skill in the art having benefit of the present disclosure should appreciate that the number of stages in the tag array pipeline 400 is a matter of design choice and may be different in some embodiments.

The data array pipeline 405 includes five stages (D0, D1, D2, D3, and D4) along the horizontal axis of the data array pipeline 405. For example, the D0 stage is a wire stage used to convey a data array lookup request to the pipeline logic, the D1 stage may be a decoding stage to decode the data array lookup request, the D2 stage may be an array access stage, and the D3 stage may be a comparison stage. Together, the stages D0-D3 may be used to access data in the cache line in the way indicated by the information provided by the tag array pipeline 400. The stage D4 may be a wire cycle that is used to move the data from the data array to a load/store unit such as the load/store unit 115 shown in FIG. 1. However, persons of ordinary skill in the art having benefit of the present disclosure should appreciate that the number of stages in the data array pipeline 405 is a matter of design choice and may be different in some embodiments.

The tag array lookup and the data array lookup are performed sequentially by the corresponding tag array pipeline 400 and data array pipeline 405. For example, a tag array lookup request associated with a read instruction A may be processed in the stage T0 during the first cycle, in the stage T1 during the second cycle, in the stage T2 during the third cycle, in the stage T3 during the fourth cycle, and in the stage T4 during the fifth cycle. Since the tag and data array lookups are performed sequentially, the data array lookup request associated with the read instruction A begins after the corresponding tag array lookup request has completed in the tag array pipeline 400. Thus, the data array lookup request associated with read instruction A may be processed in the stage D0 during the sixth cycle, in the stage D1 during the seventh cycle, in the stage D2 during the eighth cycle, in the stage D3 during the ninth cycle, and in the stage D4 during the tenth cycle.

Some embodiments of the data array pipeline 405 may have a limited number of ports for receiving data array lookup requests. For example, the data array pipeline 405 initiates one data array lookup request every two cycles. Thus, even though the tag array lookup request for the read instruction B has completed in the tag array pipeline 400, this tag array lookup request may not be processed by the data array pipeline 405 in the next cycle. Instead, the tag array lookup request for the read instruction B may be delayed by one or more cycles in some embodiments. A bubble 410 may therefore be inserted into the data array pipeline 405, which adds additional latency to the sequential process.

Figure 5:
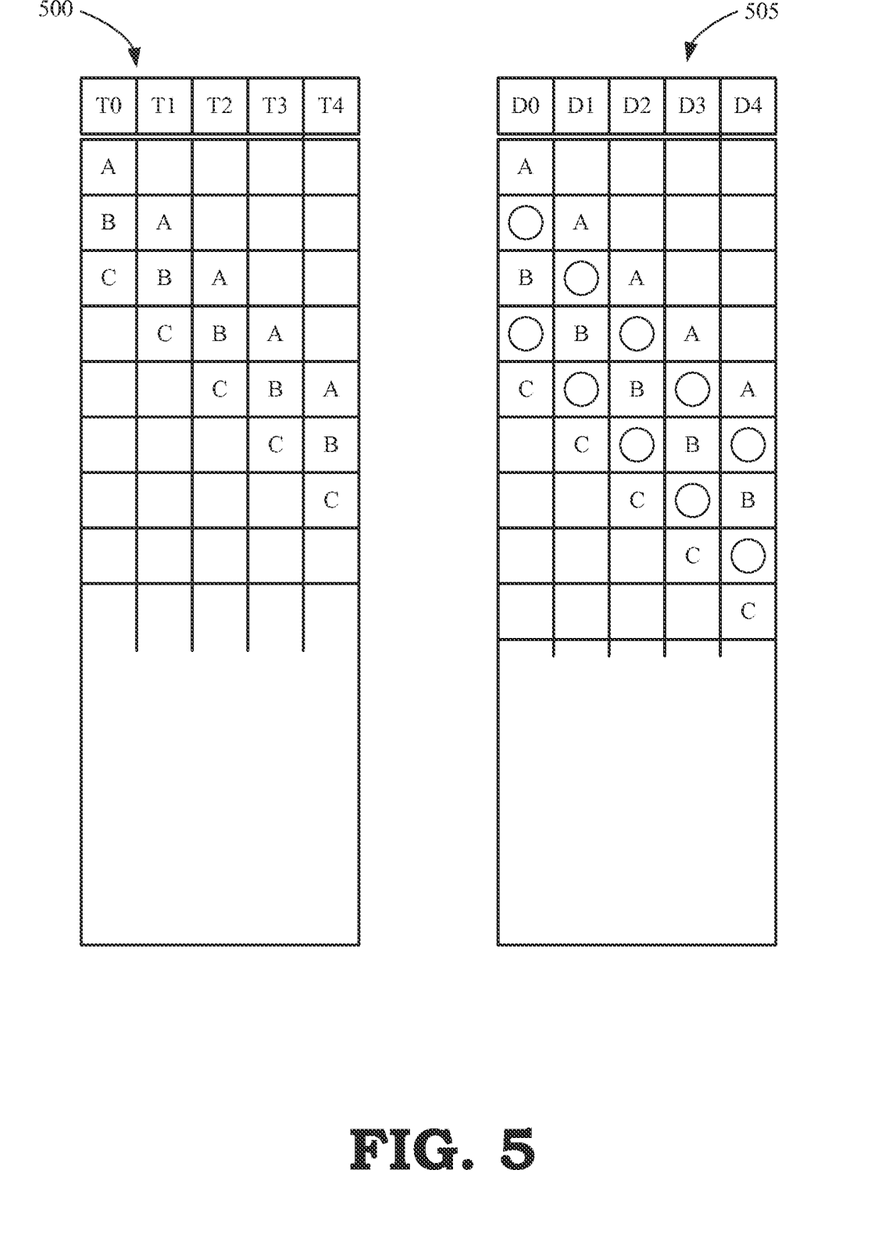
FIG. 5 is a diagram of a tag array pipeline for use in the tag array shown in FIG. 1 and a data array pipeline for use in the data array shown in FIG. 1, according to some embodiments.

FIG. 5 is a diagram of a tag array pipeline 500 for use in the tag array 105 shown in FIG. 1 and a data array pipeline 505 for use in the data array 110 shown in FIG. 1, according to some embodiments. The pipelines 500, 505 may be implemented using the same circuitry as the pipelines 400, 405 shown in FIG. 4 or they may be implemented using different circuitry. Time increases from top to bottom in the tag array pipeline 500 and the data array pipeline 505 and each box indicates one cycle of operation for the pipelines 500, 505. The tag array pipeline 500 includes five stages (T0, T1, T2, T3, and T4) along the horizontal axis of the tag array pipeline 500. The data array pipeline 505 includes five stages (D0, D1, D2, D3, and D4) along the horizontal axis of the data array pipeline 505. Operation of the tag array pipeline 500 and the data array pipeline 505 shown in FIG. 5 differs from the pipelines 400, 405 shown in FIG. 4 because the tag array lookup and the data array lookup are performed in parallel by the tag array pipeline 500 and data array pipeline 505. The particular sequence of instructions shown in FIG. 5 is exemplary and is only intended to illustrate some principles of the operation of the pipelines 500, 505.

The tag array lookup and the data array lookup for read instruction A can be picked for execution in the same cycle when the pipelines 500, 505 operate in parallel. Thus, the tag array lookup and the data array lookup are executed concurrently and proceed through the corresponding pipelines 500, 505 in parallel. Some embodiments of the pipelines 500, 505 may include a fixed one-cycle offset between picking the tag array lookup for execution in the tag array pipeline 500 and picking the data array lookup for execution in the data array pipeline 505. The data array pipeline 505 has a limited number of ports for receiving data array lookup requests and therefore the data array pipeline 505 can initiate one data array lookup request every two cycles. Thus, even though the pipelines 500, 505 operate in parallel, the tag array lookup and the data array lookup for subsequent instructions B, C, . . . may be offset from each other by an increasing number of cycles, as shown in FIG. 5.

Figure 6:
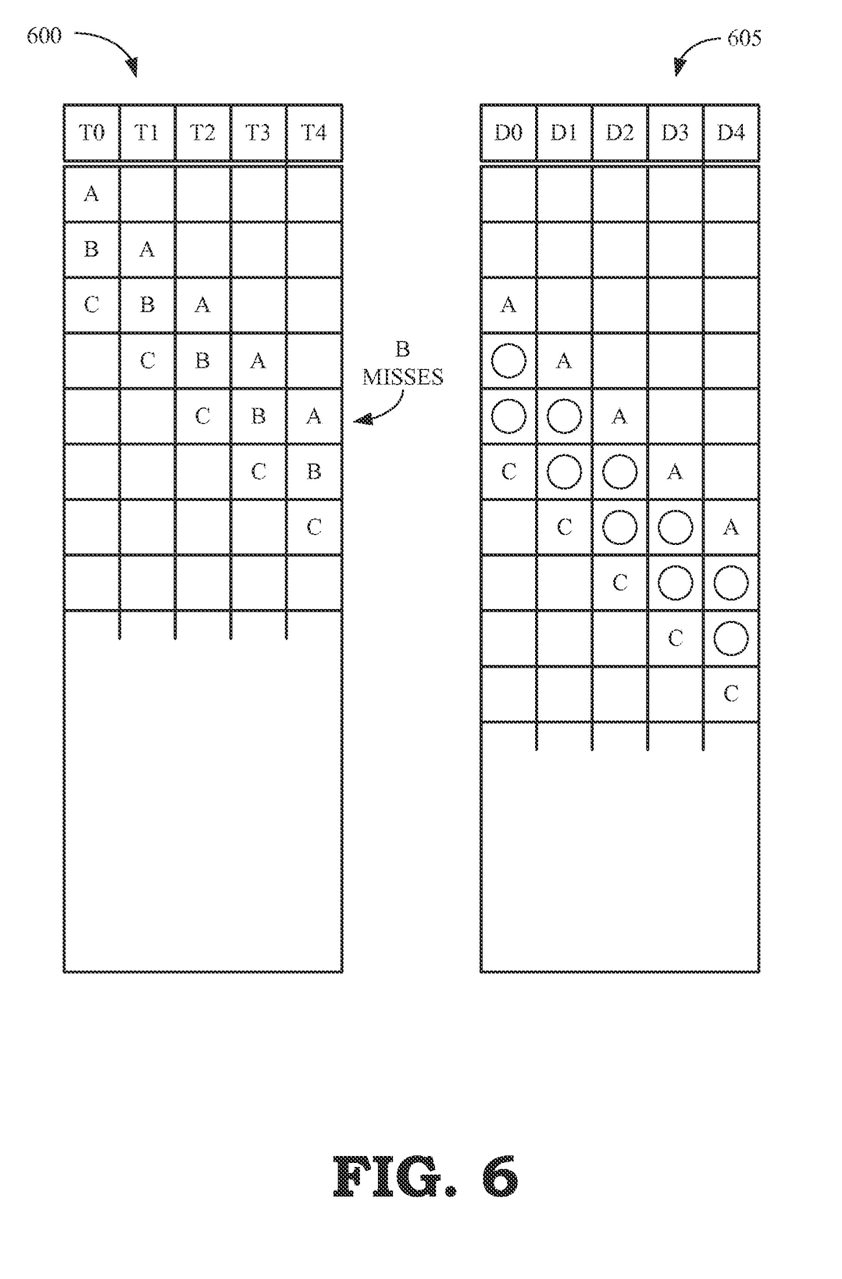
FIG. 6 is a diagram of a tag array pipeline for use in the tag array shown in FIG. 1 and a data array pipeline for use in the data array shown in FIG. 1, according to some embodiments.

FIG. 6 is a diagram of a tag array pipeline 600 for use in the tag array 105 shown in FIG. 1 and a data array pipeline 605 for use in the data array 110 shown in FIG. 1, according to some embodiments. The pipelines 600, 605 may be implemented using the same circuitry as the pipelines 400, 405, 500, 505 shown in FIGS. 4-5 or they may be implemented using different circuitry. Time increases from top to bottom in the tag array pipeline 600 and the data array pipeline 605 and each box indicates one cycle of operation for the pipelines 600, 605. The tag array pipeline 600 includes five stages (T0, T1, T2, T3, and T4) along the horizontal axis of the tag array pipeline 600. The data array pipeline 605 includes five stages (D0, D1, D2, D3, and D4) along the horizontal axis of the data array pipeline 605. Operation of the tag array pipeline 600 and the data array pipeline 605 shown in FIG. 6 differs from the pipelines 400, 405 shown in FIG. 4 and the pipelines 500, 505 shown in FIG. 5 because the data array lookup can be performed in response to resources in the data array pipeline 605 becoming available after the corresponding tag array lookup has begun execution in the tag array pipeline 600. The particular sequence of instructions shown in FIG. 6 is exemplary and is only intended to illustrate some principles of the operation of the pipelines 600, 605.

The tag array lookup and the data array lookup for read instruction A are offset by two cycles in FIG. 6. For example, latency introduced by previously executed tag/data array lookups may create the two cycle offset, e.g., because of the limited number of ports for receiving data array lookup requests in the data array pipeline 605. The tag array lookup for read instruction B is initiated in the cycle following the tag array lookup for read instruction A and proceeds through the tag array pipeline 600. The tag array lookup for read instruction C is initiated in the cycle following the tag array lookup for read instruction B and proceeds through the tag array pipeline 600. However, the tag array pipeline 600 determines that the tag array lookup for read instruction B misses in the cache at the pipeline stage T3. Consequently, resources in the data array pipeline 605 are not needed to perform a data array lookup for read instruction B.

Pick logic such as the pick logic 225 shown in FIG. 2 may bypass picking the data array lookup request for read instruction B in response to the corresponding tag array lookup missing in the cache. Since the resources that would have been consumed by the data array lookup request for read instruction B have now become available, the data array lookup request for read instruction C can be picked for execution by the data array pipeline 600. For example, variable bypass pick logic 230 shown in FIG. 2 may determine that resources in the data array pipeline 605 are available because the tag array lookup for read instruction B missed in the cache and the pick logic 225 bypassed picking the corresponding data array lookup request for execution in the data array pipeline 605. Bypassing the data array lookup request for read instruction B and opportunistically picking the data array lookup request for read instruction C in response to the pipeline resources becoming available may therefore reduce the latency of the data array pipeline 605 and improve the overall throughput.

Figure 7:
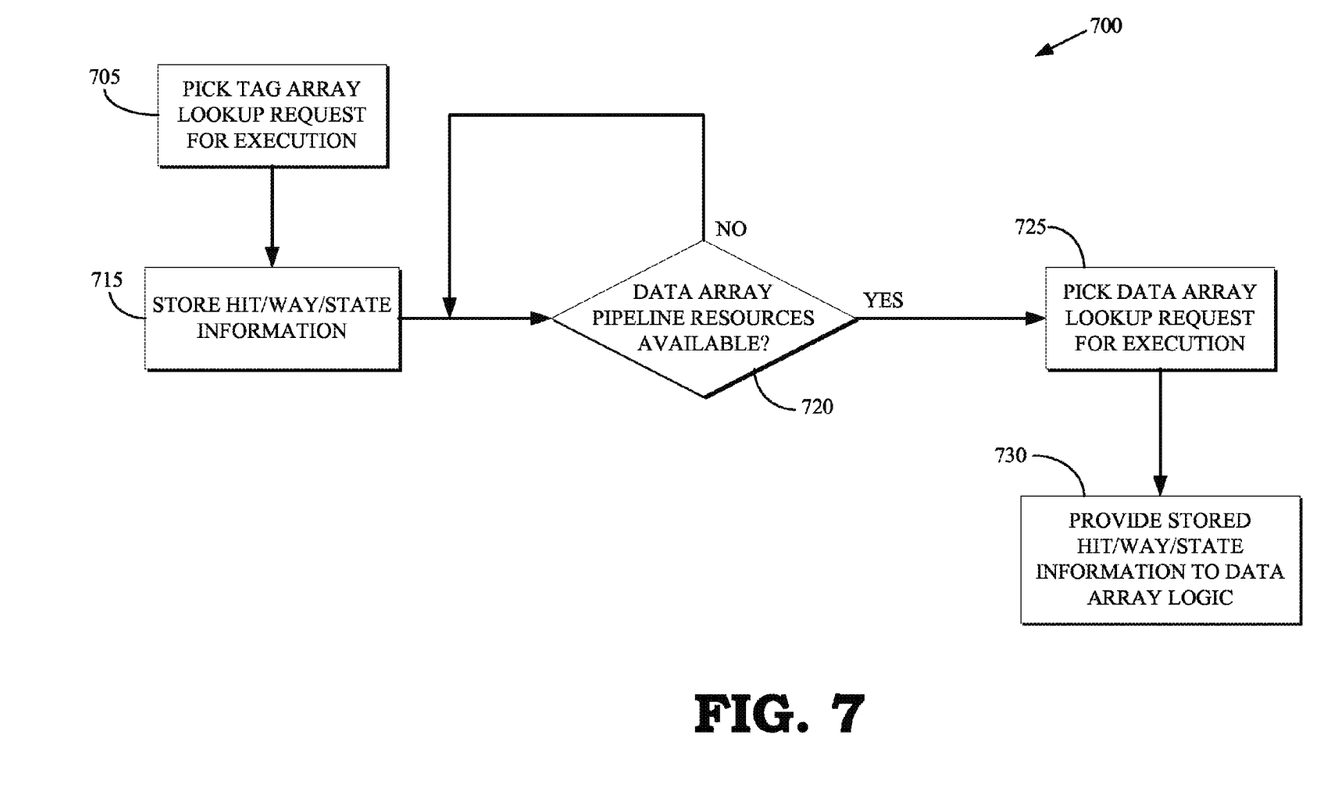
FIG. 7 is a flow diagram of a method of picking the data array lookup requests for execution in a data array pipeline at a variable distance after picking a corresponding tag array lookup request for execution in a tag array pipeline, according to some embodiments.

FIG. 7 is a flow diagram of a method 700 of picking the data array lookup requests for execution in a data array pipeline at a variable distance after picking a corresponding tag array lookup request for execution in a tag array pipeline, according to some embodiments. Some embodiments of the method 700 may be used to pick data array lookup requests for execution in the data array pipeline 605 based on the availability of resources in the data array pipeline 605, as shown in FIG. 6. At block 705, pick logic such as the pick logic 225 shown in FIG. 2 picks (at 705) a tag array lookup request for execution in a tag array pipeline. At this point, the data array lookup request corresponding to the tag array lookup request can be picked for execution in any cycle following the tag array lookup request, e.g., by the variable bypass pick logic 225 shown in FIG. 2. Information indicating whether the tag array lookup hit in the cache, the way of the cache line, or state information associated with the cache line is stored at block 715. For example, the information may be stored in a register or a register pipeline so that this information can be subsequently provided to the data array pipeline if the corresponding data array lookup request is picked for execution.

At block 720, variable bypass pick logic such as the variable bypass pick logic 230 shown in FIG. 2 determines whether data array pipeline resources are available for executing a data array lookup request at a variable distance behind the tag array lookup. As long as these resources are not available, the variable bypass pick logic can continue to monitor the resource availability of the data array pipeline. If the variable bypass pick logic determines that data array pipeline resources are available for executing a data array lookup request, the variable bypass pick logic picks the data array lookup request for execution in the data array pipeline at block 725. For example, the variable bypass pick logic may monitor the actions of the pick logic and determine that data array pipeline resources are available if the pick logic does not pick another data array lookup request for execution in the data array pipeline, e.g., in response to another tag array lookup request missing in the cache. At block 730, the store hit/way/state information associated with the tag array lookup request may be provided to the data array. For example, the way information may be used to identify the way of the cache line to be accessed by the data array lookup and the state information may be used to validate the data that is read out of the cache line.

In some embodiments, the apparatus and techniques described above are implemented in a system comprising one or more integrated circuit (IC) devices (also referred to as integrated circuit packages or microchips), such as the processor cores described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
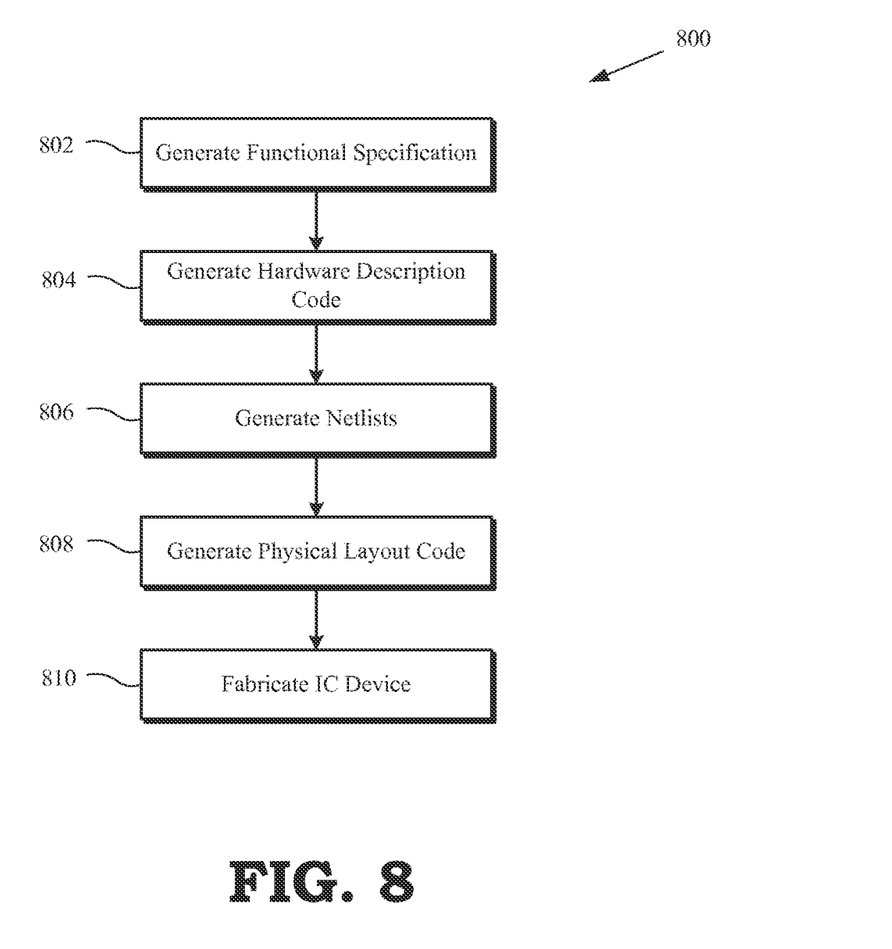
FIG. 8 is a flow diagram illustrating an example method for the design and fabrication of an IC device implementing one or more aspects, according to some embodiments.

FIG. 8 is a flow diagram illustrating an example method 800 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. Some embodiments of the hardware description code are represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable medium) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   picking a data array lookup request for execution in a data array pipeline of a cache concurrently with execution of a tag array lookup request in a tag array pipeline of the cache, the data array lookup request being picked for execution in response to resources of the data array pipeline becoming available after the tag array lookup request is picked for execution.

2. The method of claim 1, comprising marking the data array lookup request as ready to be picked for execution in the data array pipeline by a variable bypass pick logic in response to the tag array lookup request being picked for execution in the tag array pipeline.

3. The method of claim 1, wherein picking the data array lookup request for execution in the data array pipeline comprises picking an oldest data array lookup request that is associated with a tag array lookup request concurrently executing in the tag array pipeline.

4. The method of claim 1, wherein picking the data array lookup request for execution in the data array pipeline comprises picking the data array lookup request based on a priority that indicates a number of cycles since the tag array lookup request was picked for execution in the tag array pipeline.

5. The method of claim 1, wherein picking the data array lookup request for execution in the data array pipeline comprises picking the data array lookup request for execution in the data array pipeline in response to resources in the data array pipeline becoming available because a previously picked tag array lookup request missed in a tag array of the cache.

6. The method of claim 1, comprising storing information indicating at least one of a hit by the tag array lookup request in a tag array of the cache, a way of a cache line hit by the tag array lookup request, or a state of the cache line hit by the tag array lookup request.

7. The method of claim 6, wherein storing said information comprises storing said information in at least one of a register or a register pipeline.

8. The method of claim 6, comprising providing said information to the data array pipeline in response to picking the data array lookup request.

9. A cache, comprising:
   a tag array to store tags associated with cache lines in the cache;
   a data array to store the cache lines; and
   pick logic to pick a data array lookup request for execution in a data array pipeline of the data array concurrently with execution of a tag array lookup request in a tag array pipeline of the tag array, the data array lookup request being picked for execution in response to resources of the data array pipeline becoming available after picking the tag array lookup request for execution.

10. The cache of claim 9, wherein the pick logic marks the data array lookup request as ready to be picked for execution in the data array pipeline by a variable bypass pick logic in response to the tag array lookup request being picked for execution in the tag array pipeline.

11. The cache of claim 9, wherein the pick logic picks an oldest data array lookup request that is associated with a tag array lookup request concurrently executing in the tag array pipeline.

12. The cache of claim 9, wherein the pick logic picks the data array lookup request based on a priority that indicates a number of cycles since the tag array lookup request was picked for execution in the tag array pipeline.

13. The cache of claim 9, wherein the pick logic picks the data array lookup request for execution in the data array pipeline in response to resources in the data array pipeline becoming available because a previously picked tag array lookup request missed in a tag array of the cache.

14. The cache of claim 9, comprising at least one register to store information indicating at least one of a hit by the tag array lookup request in a tag array of the cache, a way of a cache line hit by the tag array lookup request, or a state of the cache line hit by the tag array lookup request.

15. The cache of claim 14, comprising at least one first multiplexer to provide a first portion of the information stored in said at least one register to the data array in response to the pick logic picking the data array lookup request.

16. The cache of claim 15, comprising data pipe control logic and at least one second multiplexer to provide a second portion of the information stored in said at least one register to the data pipe control logic in response to the pick logic picking the data array lookup request.

17. A non-transitory computer readable medium including instructions that when executed configures a manufacturing process used to manufacture a semiconductor device comprising:
   a tag array to store tags associated with cache lines in the cache;
   a data array to store the cache lines; and
   pick logic to pick a data array lookup request for execution in a data array pipeline of the data array concurrently with execution of a tag array lookup request in a tag array pipeline of the tag array, the data array lookup request being picked for execution in response to resources of the data array pipeline becoming available after picking the tag array lookup request for execution.

18. The non-transitory computer readable medium set forth in claim 17, wherein the semiconductor device further comprises at least one register to store information indicating at least one of a hit by the tag array lookup request in a tag array of the cache, a way of a cache line hit by the tag array lookup request, or a state of the cache line hit by the tag array lookup request.

19. The non-transitory computer readable medium set forth in claim 18, wherein the semiconductor device further comprises at least one first multiplexer to provide a first portion of the information stored in said at least one register to the data array in response to the pick logic picking the data array lookup request.

20. The non-transitory computer readable medium set forth in claim 19, wherein the semiconductor device further comprises data pipe control logic and at least one second multiplexer to provide a second portion of the information stored in said at least one register to the data pipe control logic in response to the pick logic picking the data array lookup request.

* * * * *